United States Patent [19]

Yonezawa et al.

[11] Patent Number: 5,463,751
[45] Date of Patent: Oct. 31, 1995

[54] MEMORY DEVICE HAVING ADDRESS TRANSLATOR AND COMPARATOR FOR COMPARING MEMORY CELL ARRAY OUTPUTS

[75] Inventors: Hirokazu Yonezawa, Moriguchi; Seiji Yamaguchi, Hirakata, both of Japan

[73] Assignee: Matsushita Electric Industrial Co., Ltd., Osaka, Japan

[21] Appl. No.: 358,688

[22] Filed: Dec. 19, 1994

Related U.S. Application Data

[63] Continuation-in-part of Ser. No. 130,146, Sep. 17, 1993, abandoned, which is a continuation of Ser. No. 616,653, Nov. 21, 1990, abandoned.

[30] Foreign Application Priority Data

Nov. 22, 1989 [JP] Japan .................................. 1-304231

[51] Int. Cl.$^6$ .................................................. G06F 12/10
[52] U.S. Cl. ...................... 395/401; 365/49; 365/230.01; 365/230.06; 364/DIG. 1; 395/435; 395/410
[58] Field of Search ...................................... 364/200, 900; 395/425, 800, 400

[56] References Cited

U.S. PATENT DOCUMENTS

| | | | |
|---|---|---|---|
| 4,400,770 | 8/1983 | Chan et al. | 395/400 |
| 4,430,701 | 2/1984 | Christian et al. | 395/425 |
| 4,884,197 | 11/1989 | Sachs et al. | 395/425 |
| 4,996,641 | 2/1991 | Talgam et al. | 395/425 |
| 5,111,389 | 5/1992 | McAuliffe et al. | 395/800 |

FOREIGN PATENT DOCUMENTS 3-218547  9/1991  Japan .

*Primary Examiner*—Glenn Gossage
*Assistant Examiner*—B. James Peikari
*Attorney, Agent, or Firm*—Wenderoth, Lind & Ponack

[57] ABSTRACT

A semiconductor memory device has an address translator and a comparator. An entry of the address translator includes an associative memory cell array for storing and comparing a logical address of at least m bits. A first decoder generates a first word signal for the associative memory cell array. A first random access memory cell array stores a physical address of m bits. A controller generates a word signal for the first random access memory cell according to the first word signal and a result of a comparison by the associative memory cell array. A second random access memory cell stores a physical address of m bits. The second random access memory cell is physically disposed near the first random access memory cell array. A second decoder generates a second word signal for the second random access memory cell array. Outputs of the first and second random access memory cell arrays are connected to and compared by the comparator which outputs a signal upon coincidence between the outputs of the first and second random access memory cell arrays.

12 Claims, 9 Drawing Sheets

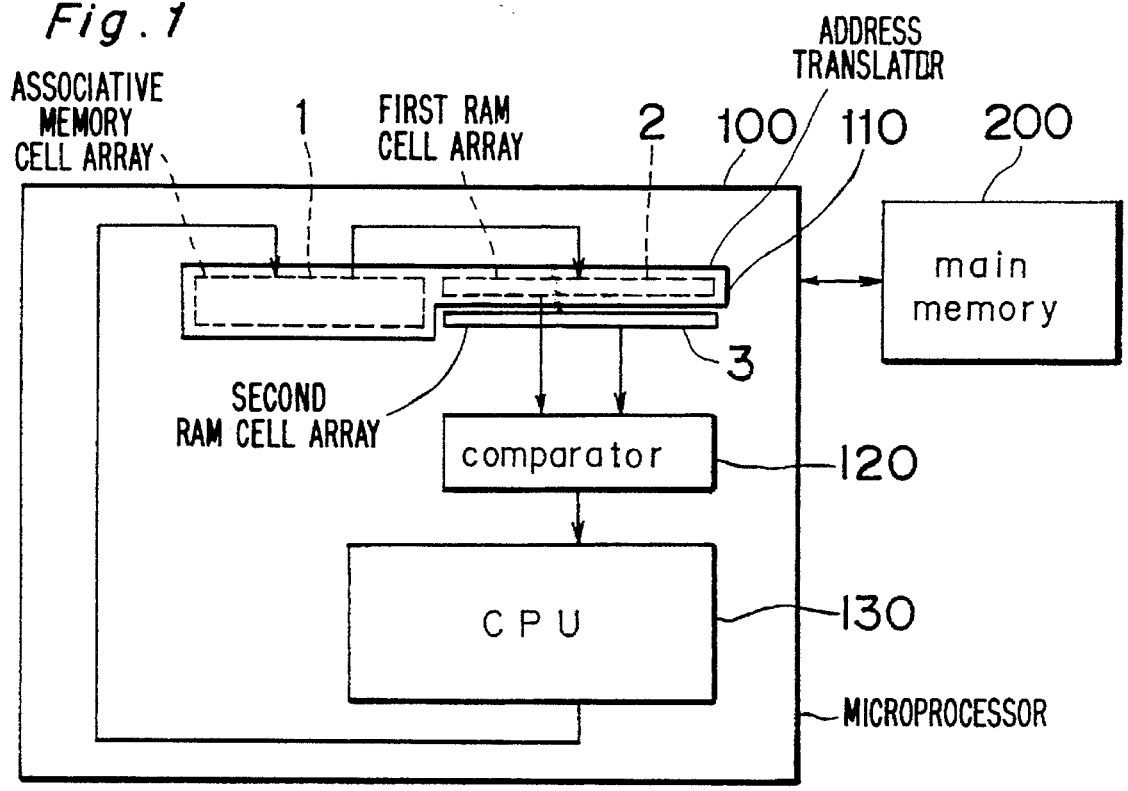
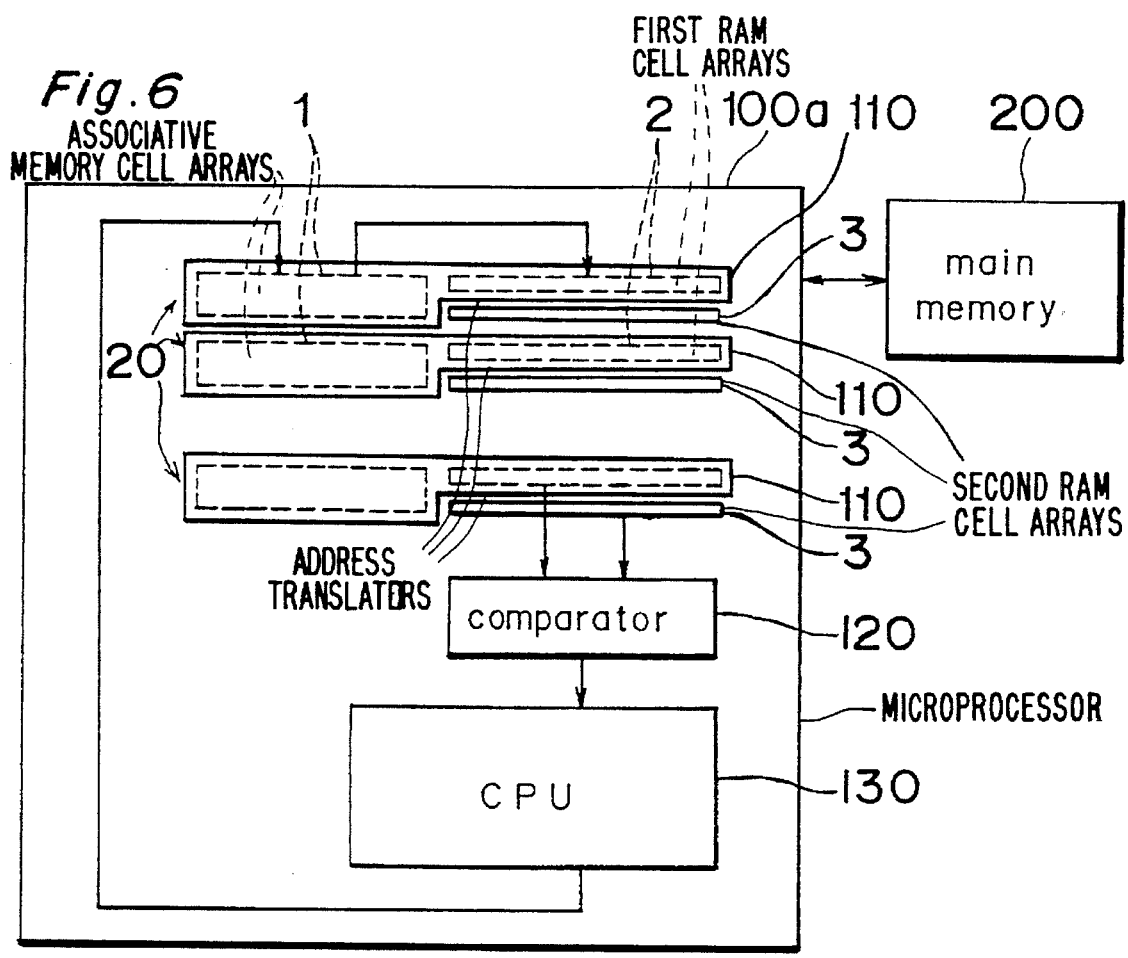

MEMORY DEVICE HAVING ADDRESS TRANSLATOR AND COMPARATOR FOR COMPARING MEMORY CELL ARRAY OUTPUTS

This is a continuation in part of Ser. No. 130,146, Sep. 17, 1993 and which is a continuation of Ser. No. 616653 filed Nov. 21, 1990, both abandoned.

BACKGROUND OF THE INVENTION

The present invention relates to a semiconductor memory device of a microprocessor having a virtual memory scheme. More particularly, the present invention relates to a semiconductor memory device having an address translator.

Recently, microprocessors have tended to have more functions and to be integrated at a higher density, and have tended to adopt a virtual memory scheme and to have internal memories such as a cache memory which can store the same data as a part of the data stored in a main memory and can be accessed by a physical address. For example, a principal action of a microprocessor having a virtual memory scheme having an address translator and an internal cache memory is as follows: First, a logical address in the virtual memory space is fed to the address translator which outputs a physical address in the real memory space in correspondence with the logical address, while a tag memory in the cache memory also outputs a physical address of data stored in the cache memory, and the two physical addresses are transmitted to a comparator for comparison. When the two physical addresses coincide, the central processing unit of the microprocessor processes data to be read not from an external memory, but from the internal cache memory, so that the processing of the central processing unit can be made faster. As explained above, in previous semiconductor memory devices, it is generally necessary to simultaneously transmit both output data of the address translator and output data cache tag memory to the same functional block or to a comparator.

As the clock frequency of a microprocessor increases, it becomes more and more necessary to make the above-mentioned processing faster. In previous microprocessors, the processing speed is increased by making the processing speeds of the functional blocks, such as the address translator and the cache memories, faster.

In the microprocessors mentioned above, the address translator and the other memories are regarded as independent functional blocks, and the actual structure and floor plan arrangement of these function blocks are such that they are separated from each other. Therefore, it is necessary to simultaneously transmit data output by such function blocks to a distant functional block or a comparator. Thus, even if the function block for data to be transmitted is located near either the address translator or the tag memory of the cache memory, it is necessary to perform data transmittance at least for a distance from the address translator or the tag memory to the functional block, and the transmittance time is one of the factors which prevents making the processing faster.

SUMMARY OF THE INVENTION

It is an object of the present invention to provide a semiconductor memory device of a microprocessor having virtual memory scheme, wherein an address translator and an internal memory can transmit data fast to a same functional block.

This object can be effected by providing a semiconductor memory device according to the present invention which comprises a semiconductor memory device having an address translator and a comparator, at least one entry of the address translator comprising:

(a) an associative memory cell array for storing and comparing a logical address of at least m bits;

(b) a first decoder connected to said associative memory cell array for generating a first word signal for said associative memory cell array;

(c) a first random access memory cell array for storing a physical address of m bits;

(d) a control means connected to said associative memory cell array and said first random access memory cell array for generating a word signal for said first random access memory cell array according to said first word signal and a result of a comparison by said associative memory cell array;

(e) a second random access memory cell array for storing a physical address of m bits, said second random access memory cell array being physically disposed near said first random access memory cell array;

(f) a second decoder connected to said second random access memory cell array for generating a second word signal for said second random access memory cell array;

wherein outputs of said first and second random access memory cell arrays are connected to and compared by the comparator which outputs signal upon a coincidence between said outputs of said first and second random access memory cell arrays.

One advantage of a semiconductor memory device according to the present invention is that the transmittance distance from an address translator and a cache tag memory to the same functional block can be shortened so as to reduce the transmittance signal delay.

Another advantage of a semiconductor memory device according to the present invention is that the density of the functional blocks in the microprocessor can be increased.

BRIEF EXPLANATION OF THE DRAWINGS

Further objects and advantages of the present invention will be apparent from the following description with reference being made to the accompanying drawings, wherein preferred embodiments of the present invention are clearly shown.

FIG. 1 is a schematic block diagram of a microprocessor according to Example 1 of the present invention.

FIG. 6 is a schematic block diagram of a microprocessor according to modification of Example 1.

DESCRIPTION OF THE PREFERRED EMBODIMENTS

Figure 2:
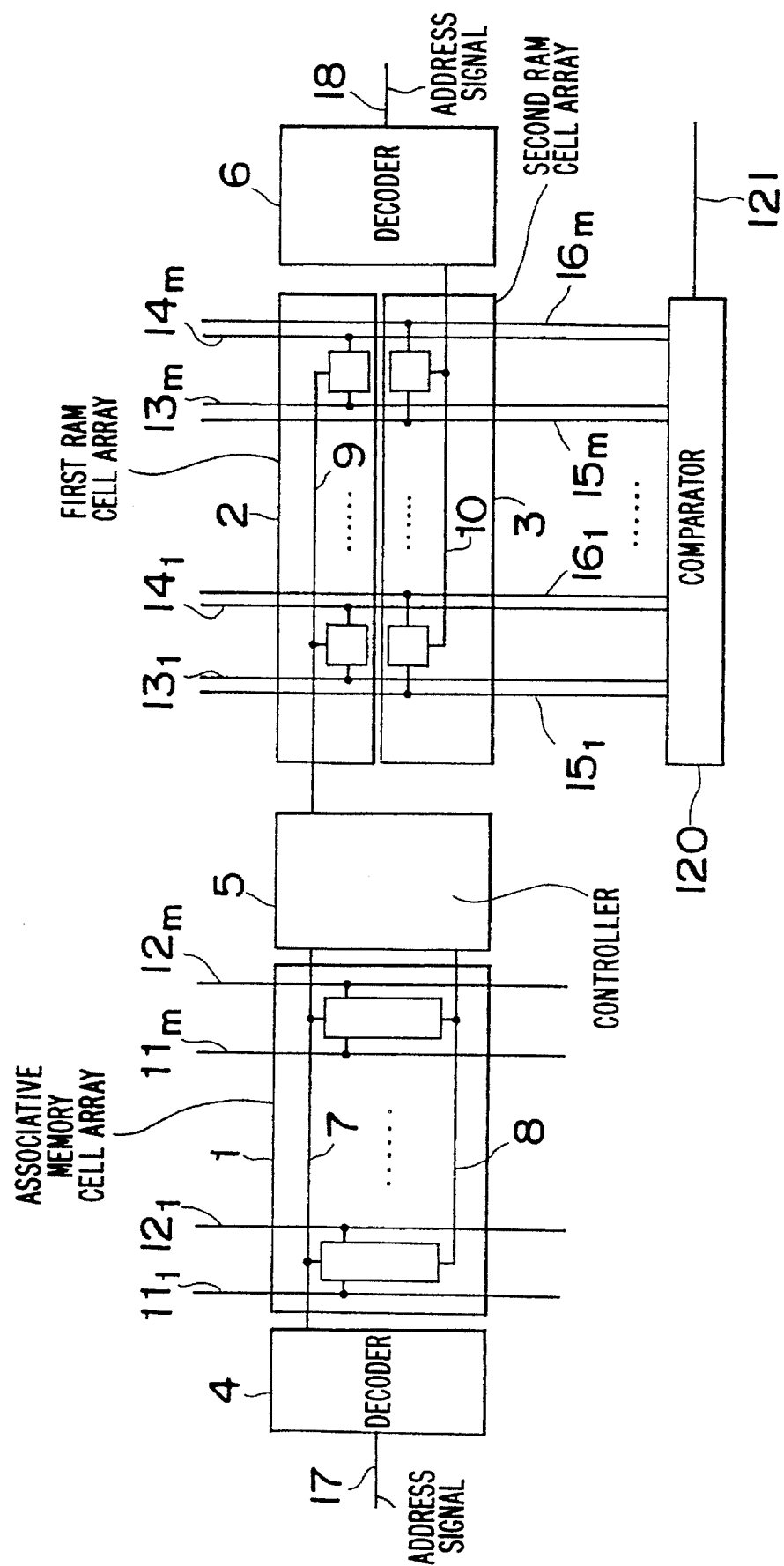
FIG. 2 is a schematic block diagram of one entry of a semiconductor memory device according to Example 1.

Referring now to the drawings, wherein like reference characters designate like or corresponding parts throughout several views, embodiments of the present invention will be explained in detail.

Example 1

FIG. 1 is a schematic block diagram of a microprocessor 100 having a virtual memory scheme including an address translator. The address translator 110 includes two memories, associative memory cell array 1 and a first random access memory cell array 2. Both memory cell arrays 1 and 2 are aligned as arrays, while the number of transistors composing the associative memory cell array 1 is generally larger than that composing the first random access memory cell array 2. Thus, the width of the associative memory cell array 1 is wider than that of the random access memory cell array 2 in a direction perpendicular to the arrays, and when both memory cells 1 and 2 are aligned, a space arises around the first random access memory cell array 2 so that a second random access memory cell array 3 can be positioned in a space which is not separated from, but is rather close by the first random access memory cell array 2 of the address translator 110. The output data of both memory cell arrays 2 and 3 are simultaneously fed to a comparator 120. Thus, the transmittance distance from the two memory cell arrays 2 and 3 to the same function block or the comparator 120 can be shortened. The result of the comparison is fed to a central processing unit 130.

A block diagram of an example according to the present invention is shown in FIG. 2, wherein element 1 is an associative memory cell array; elements 2 and 3 are first and second random access memory cell arrays; elements 4 and 6 are decoders; element 5 is a controller; elements 7, 9 and 10 are word signals; element 8 is a coincidence detection line; elements 11, 12, 13, 14, 15 and 16 are bit lines, and elements 17 and 18 are address signals. An address signal 17 is fed to the decoder 4, which is connected to the associative memory cell array 1 and the controller 5 so as to output a word signal 7. The first to m-th bit lines $11_1$ to $11_m$ of the bit line 11 and the counterpart $12_1$ to $12_m$ of the bit line 12 are respectively connected to the first to m-th associative memory cell of the associative memory cell array 1, while the coincidence detection lines 8 are connected between the associative memory cells and the controller 5. The controller 5 is connected to the random access memory cells of the first random access memory cell array 2 so as to output a word signal 9. The first to m-th bit lines $13_1$ to $13_m$ of the bit line 13 and bit lines $14_1$ to $14_m$ of the bit line 14 are respectively connected to the first to m-th random access memory cell of the first random access memory cell array 2. An address signal 18 is fed to the decoder 6, which is connected to the first to m-th random access memory cells of the second random access memory cell array 3. The first to m-th bit lines $15_1$ of the bit line 15 to $15_m$ and those $16_1$ to $16_m$ of the bit line 16 are respectively connected to the first to m-th random access memory cell of the second random access memory cell array 3.

As shown in FIG. 2, the first and second random access memory cell arrays 2 and 3 are arranged perpendicular to the bit lines 13, 14, 15 and 16, and a random access memory cell of the random access memory cell array 2 is arranged near a counterpart of the random access memory cell array 3. Furthermore, the bit lines are connected to a comparator 120 arranged near the random access memory cell arrays 2 and 3, and the result of its comparison is output to an output line 121. Thus, data stored in the random access memory cell arrays 2 and 3 can be outputted from adjacent sites to the same functional block.

In this example, the width of the associative memory cell array 1 in the direction of the bit lines 11 and 12 is about twice that of the random access memory cell arrays 2 and 3, and the two random access memory cell arrays 2 and 3 are positioned in parallel to each other in a direction perpendicular to that of the bit lines 13, 14, 15 and 16.

Figure 3:
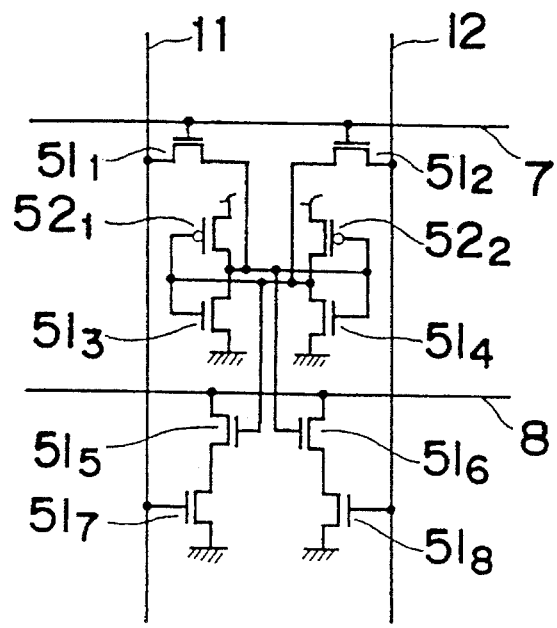
FIG. 3 a circuit diagram of an example of an associative memory cell.

FIG. 3 shows a circuit diagram of an example of an associative memory cell, which is composed of N-channel MOS transistors $51_1$ to $51_8$ and P-channel MOS transistors $52_1$, $52_2$, these transistors being connected to the bit lines 11 and 12 and of word signal 7 and the coincidence detection line 8 as shown in FIG. 3.

Figure 4:
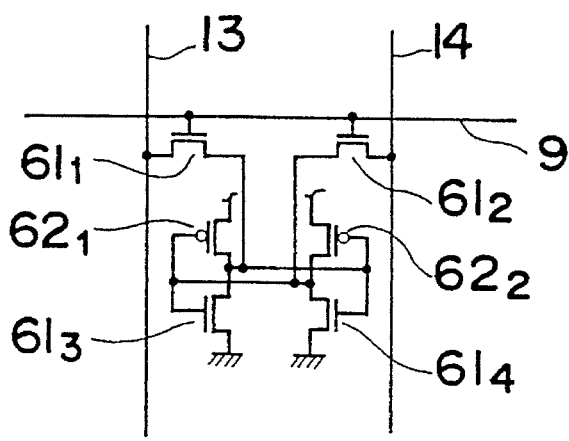
FIG. 4 is a circuit diagram of an example of a random access memory cell.

FIG. 4 shows a circuit diagram of an example of a random access memory cell, which is composed of N-channel MOS transistors $61_1$ to $61_4$ and P-channel MOS transistors $62_1$ and $62_2$, these transistors being connected to the bit lines 13 and 14 and the line for a word signal 9 as shown in FIG. 4.

As shown in FIGS. 3 and 4, the number of transistors which form the associative memory cell is larger than that of the random access memory cell, and the width of the associative memory cell is longer than that of the random access memory cell in the direction along the bit lines 11 to 14.

Figure 5:
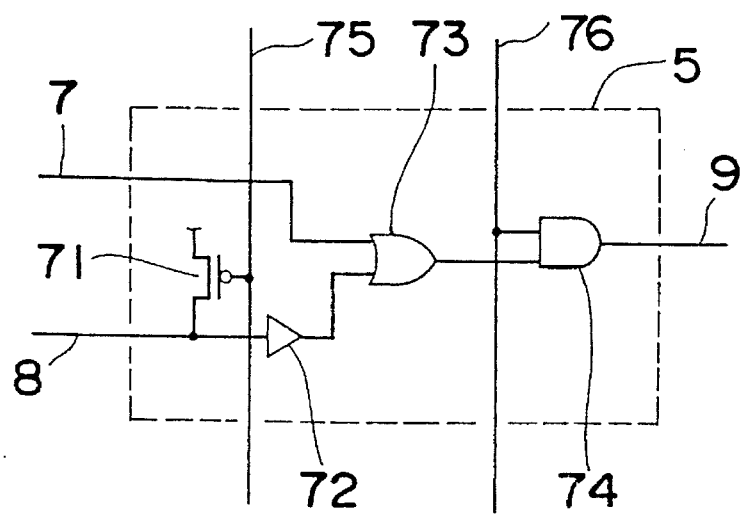
FIG. 5 is a circuit diagram of an example of a controller.

FIG. 5 shows a circuit diagram of an example of a controller 5, which is composed of a P-channel MOS transistor 71, a sense amplifier 72, an OR gate 73 and an AND gate 74. Control signals 75 and 76 are provided by the central processing unit 130 to the gate of the transistor 71 and to one of the inputs of the AND gate 74. A word signal 7 is provided to one of the inputs of the OR gate 73, while a coincidence detection line 8 is provided to the input of the sense amplifier 72 and the drain electrode of the MOS transistor 71 whose source electrode is connected to a voltage source $V_{cc}$. The output of the sense amplifier 72 is connected to the other input of the OR gate 73, the output of which is connected to one of the inputs of the AND gate 74 which provides a word signal 9.

In a write action, first, the control signal 75 is switched to an H level, while the control signal 76 is switched to an H level. Then, when a word signal line 7 is selected or a word signal is supplied to the OR gate 73, the line of the word signal 9 is selected via the OR gate 73 and the AND gate 74. In other words, the controller 5 operates as a gate to pass a word signal 7 as a word signal 9 to the first random access memory cell array 2 when data is written in the memory cell array 2.

In a read action, first, the control signal 76 is switched to an L level while the control signal 75 is switched to an L level in order to precharge the coincidence detection line 8. Then, the control signal 75 is turned off or switched to an H level while the control line 76 is turned on or switched to an H level. Then, a result of comparison is sent via the coincidence detection line 8 to be detected by the sense amplifier 72, and the word signal line 9 is selected via the OR gate 73 and the AND gate 74. In other words, the controller 5 sends a word signal 9 when a coincidence signal is received.

Next, the operation of this Example is explained below. In a write action, the decoder 4 generates word signal 7 by using an address signal 17, and signals of a logical address and an inverted version thereof are respectively fed to the bit lines 11 and 12. Thus, a logical address of m bits is written in the associative memory cell array 1. Then, by using the word signal 7, the controller 5 generates a word signal 9 for the random access memory cell array 2, while signals of a physical address and an inverted version thereof are respectively fed to the bit lines 13 and 14. Thus, a physical address of m bits is written in the first random access memory cell array 2. On the other hand, by using an address signal 18, the decoder 6 generates a word signal 10 of the second random access memory cell array 3 which is arranged in the same entry, that is, word, of the address translator, and signals and inverted versions thereof are respectively fed to the bit lines 15 and 16. Thus, data of m bits is written in the second random access memory cell array 3.

In a read operation, signals of m bits of a logical address and an inverted version thereof are respectively fed to the bit lines 11 and 12 of the associative memory cell array 1 of the address translator, so that the associative memory cell array 1 compares the logical address received and the logical address stored and outputs a comparison result to the coincidence detection line 8. Next, by using the coincidence detection line 8, the controller 5 generates a word signal 9 of the first random access memory cell array 2, so that a physical address of m bits is read from the first random access memory cell 2 to be sent to the bit lines 13 and 14 to a comparator 120. On the other hand, by using an address signal 18, the decoder 6 generates a word signal 10 of the second random access memory cell array 3 which is arranged in the same entry, that is, word, of the address translator, so that data of m bits is read out from the second random access memory cell array 3 to be sent via the bit lines 15 and 16 to a comparator 120. Because the first and second random access memory cell arrays 2 and 3 are arranged in the same entry, data is output from adjacent locations.

As explained above, in a semiconductor memory device according to this Example, a plurality of random access memory cell arrays 2 and 3 are positioned in the same entry of the address translator, and the distance between the data outputs of data read from the cell arrays 2 and 3 are shortened, so that the data transmittance distance and the data transmittance delay can be shortened.

In a write action, the central processing unit 130 outputs a logical address to the address translator 110, which stores the logical address in the associative memory cell array 1 and a physical address in the first random access memory cell array 2 the physical address being translator from the logical address. On the other hand, a physical address is stored in the second random access memory cell array 3.

In a read action, the central processing unit 130 outputs a logical address to the address translator 110, and the associative memory cell array 1 compares the received logical address with the stored logical address in the associative memory cell array 1. If both logical addresses agree with each other, a physical address data is read from the first random access memory cell array 2 to be sent to the comparator 120, while another physical address data is also read from the second random access memory cell array 3 to be sent to the comparator 120. If both data agree with each other, data at the physical address is read from a main memory 200 connected via a bus to the microprocessor 100.

FIG. 6 shows a schematic block diagram of a microprocessor 100a of a modified Example 1. In this example, a plurality of entries 20 are aligned close by each other, each of the entries having a structure shown in FIG. 2. Though not shown clearly for simplicity, bit lines 11, 12, 13, 14, 15 and 16 are connected commonly to each entry 20, in a fashion similar to Example 2 which will be explained later. An entry is a unit which comprises a decoder 4, an associative memory cell array 1, a controller 5, a first random access memory cell array 2, a second random access memory cell array 3 and a decoder 6, and deals with information of a word.

In this example, the number of the bits of the associative memory cell array 1 is the same as the number of the bits of the random access memory cell arrays 2 and 3. However, when the number of the bits are different, the structure of Example 1 can be partially applied.

Example 2

Figure 7:
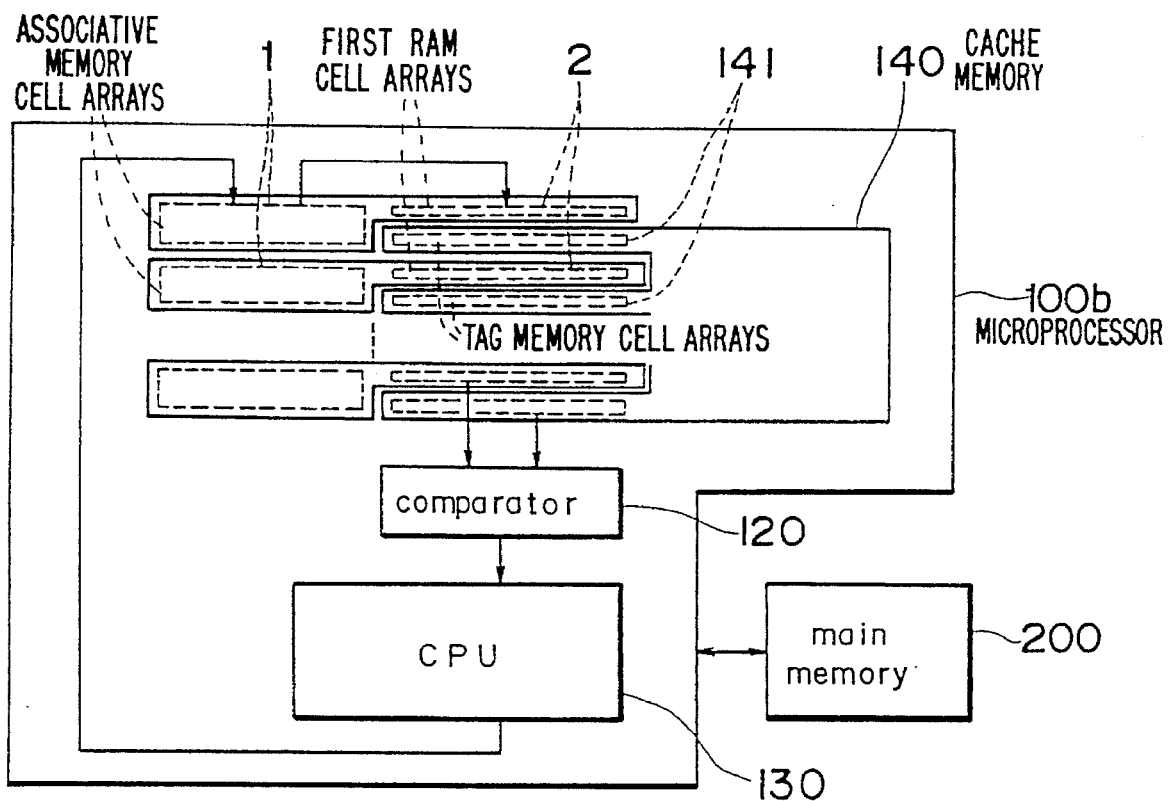
FIG. 7 is schematic block diagram of a microprocessor according to Example 2 of the present invention.

FIG. 7 shows a schematic block diagram of a microprocessor 100b having a virtual memory scheme, and the same elements as shown in FIG. 1 are designated by the same reference numbers. This microprocessor 100b is different from the counterpart 100 shown in FIG. 1 in that the microprocessor 100b has a tag memory cell array 141 of a cache memory 140 as the second random access memory cell array 3. In the cache memory 140, the same data as a part of the data stored in a main memory 200 is stored, and the tag memory 141 stores the physical address.

Figure 8:
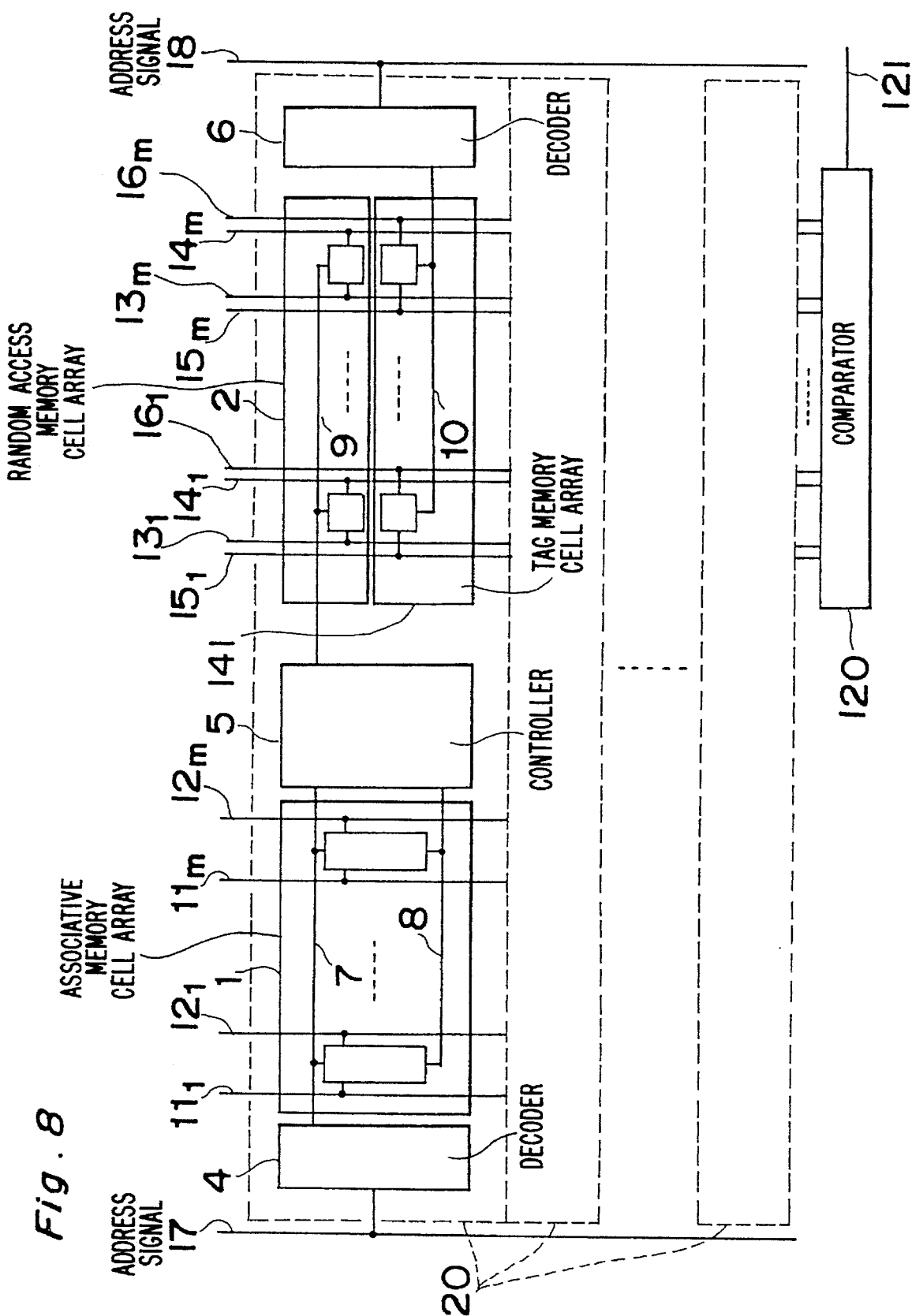
FIG. 8 is a schematic block diagram of a semiconductor memory device according to Example 2.

FIG. 8 shows a block diagram of a second example according to the present invention, and the same elements as shown in FIG. 1 are designated by the same reference numbers. In FIG. 8, element 1 is an associate memory cell array; element 2 is a random access memory cell array; elements 4 and 6 are decoders; element 5 is a controller; elements 7, 9 and 10 are word signals; element 8 is a coincidence detection line elements 17 and 18 are address signals; element 120 is a comparator; element 121 is an output signal of comparator, and element 141 is a tag memory cell array.

Example 2 also differs from Example 1 in that a plurality of entries 20 is provided, and they are connected in common with the bit lines 11–16 and address signals 17 and 18. The structure of each entry 20 is the same as that of Example 1, except that in Example 2, a tag memory cell array 141 of a cache memory 140 to be accessed by a physical address is used as a second random access memory cell array 3 arranged in the entry of the address translator.

The operation of Example 2 will be explained below. In a write operation, the decoder 4 generates a word signal 7 by using an address signal 17, and signals of logical addresses and inverted versions thereof are respectively fed to the bit lines 11 and 12. Thus, a logical address of m bits is written in the associative memory cell array 1. Then, by using the word signal 7, the controller 5 generates a word signal 9 for the random access memory cell array 2, while signals of physical addresses and inverted versions thereof are respectively fed to the bit lines 13 and 14. Thus, a physical address of m bits is written in the random access memory cell array 2. On the other hand, by using an address signal 18, the decoder 6 generates a word signal 10 of the tag memory cell array 141 which is arranged in the same entry of the address translator, and signals and inverted versions thereof are respectively fed to the bit lines 15 and 16. Thus, data of m bits is written in the tag memory cell array 141.

In a read operation, signals of m bits of logical addresses and inverted versions thereof are respectively fed to the bit lines 11 and 12 of the associative memory cell array 1 of the address translator, so that the associative memory cell array 1 compares the received logical address and the stored logical address so as to output the comparison result to the coincidence detection line 8. Next, by using the coincidence detection line 8, the controller 5 generates a word signal 9 of the random access memory cell array 2, so that a physical address of m bits is read from the random access memory cell array 2 to be fed to the bit lines 13 and 14. On the other hand, by using an address signal 18, the decoder 6 generates a word signal 10 of the tag memory cell array 141 which is arranged in the same entry of the address translator, and thus, data of m bits is read out from the tag memory cell array 141 to be sent to the bit lines 15 and 16. The physical addresses read out from the random access memory cell array 2 and from the tag memory cell array 141 are input to the comparator 120 to be compared so as to output a result at the output 121.

If the physical addresses read out from the memory cell arrays 2 and 141 agree with each other, data at the physical address is read from a cache memory 140. If the physical addresses read out from the memory cell arrays 2 and 141 do not agree with each other, data at the physical address is read from a main memory 200 connected via a bus to the microprocessor 100b.

As explained above, when two pieces data are transmitted to the comparator or the same functional block, they are transmitted from adjacent places. Thus, if a functional block to which the data will be transmitted is arranged near a semiconductor memory device according to this Example, the data transmittance distance can be very short, and the transmittance delay can be shortened.

In this Example, the number of the entries of the address translator is the same as the number of entries of the tag memory cell array 141. However, even when the number of entries are different, the structure of Example 2 can be partially applied.

In this example, the number of the bits of the associative memory cell array 1 is the same as the number of the bits of arrays 2 and 141. However, when the numbers of the bits are different from each other, the structure of Example 2 can be partially applied.

Furthermore, an associative memory is generally larger than a random access memory, that is, the number of transistors of an associative memory is larger than that of a random access memory, so that there is a problem in that when memories are arranged as arrays, there arises an unnecessary space in the side of the random access memory. However, as shown in the above-mentioned Example, if the width of an associative memory cell is about twice that of a random access memory cell in the direction of the bit lines, an unnecessary space can be avoided by arranging two random access memory cell arrays in parallel in a direction perpendicular to the bit lines.

As is apparent from the above-mentioned Examples, in a memory device according to the present invention, several memories are included in the same entry in the address translator, and are not separated from each other, and data is output from adjacent sites. Thus, the data transmittance distance between an address translator and a memory can be shortened, and the data transmittance delay can be shortened. In other words, a memory can be accessed at a faster speed.

Further, an unnecessary space arises in the side of a random access memory cell array when an associative memory cell and the random access memory cell are arranged as arrays. However, the unnecessary space can be eliminated by arranging at least two random access memory cell arrays in parallel in a direction perpendicular to the bit lines. That is, the integration density can be improved.

Thus, the high speed and high integration density can be realized according to the present invention, and the practical effects of the present invention are significant.

Example 3

Figure 9:
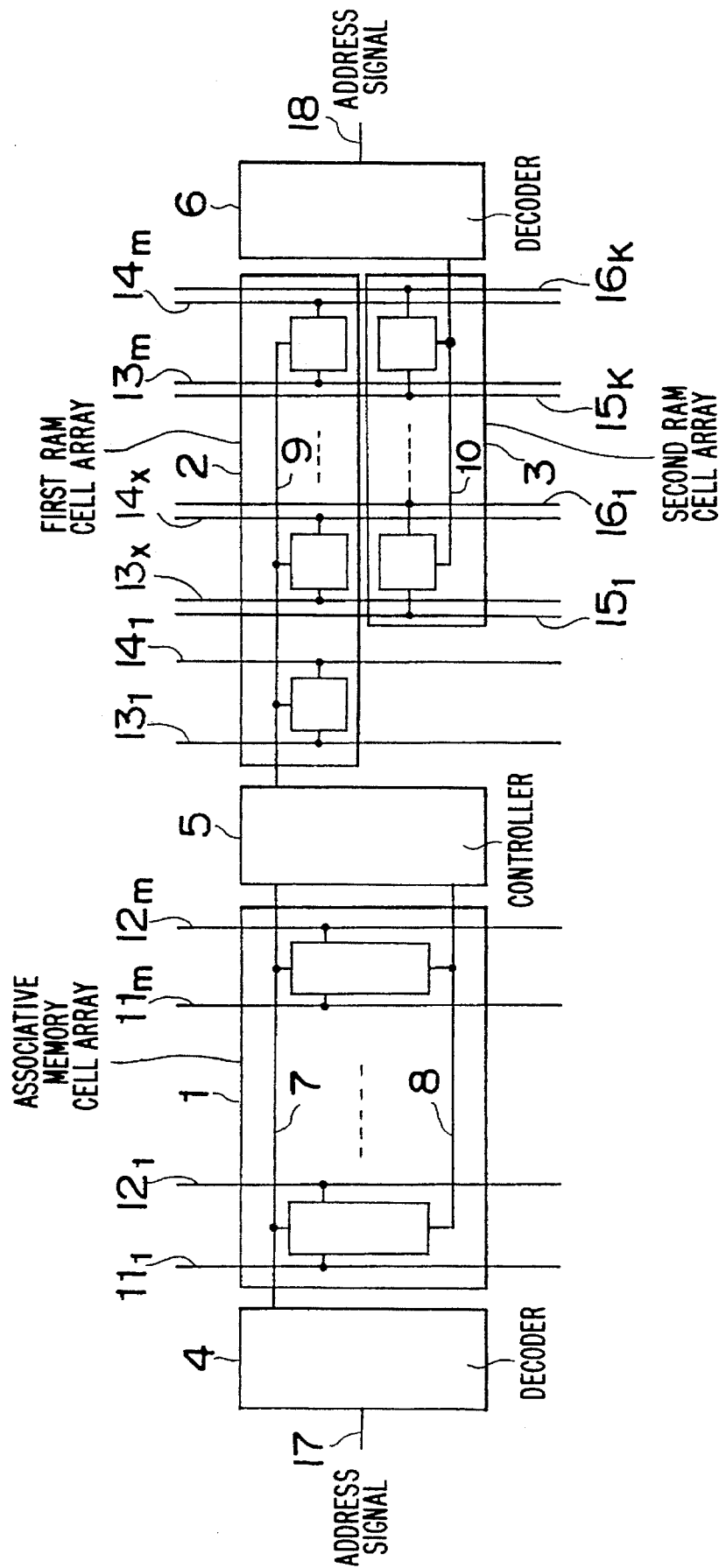
FIG. 9 is a schematic block diagram of a semiconductor memory device according to Example 3 of the present

FIG. 9 shows a schematic block diagram of a semiconductor memory device of Example 3. The structure of this device differs from that of Example 1 only in that the number of the bits (m) of a first random access memory cell array 2 is different from that (k) of a second random access memory cell array 3. In this Example, m>k.

A write operation is performed as explained in Example 1.

In a read operation, a physical address of m bits is read from the first random access memory cell array 2 and sent to the bit lines 13 and 14, as explained in Example 1. On the other hand, by using an address signal 18, the decoder 6 generates a word signal 10 of the second random access memory cell array 3, from which data of k bits is read and sent to the bit lines 15 and 16. Because the first and second random access memory cell array 2 and 3 are located near each other, data of m bits and data of k bits are sent from adjacent places to a common functional block.

Though m>k in this Example, the bit number m may be smaller than the bit number k. Thus, a general memory other than a tag memory can be used as the second random access memory cell array 3.

Example 4

Figure 10:
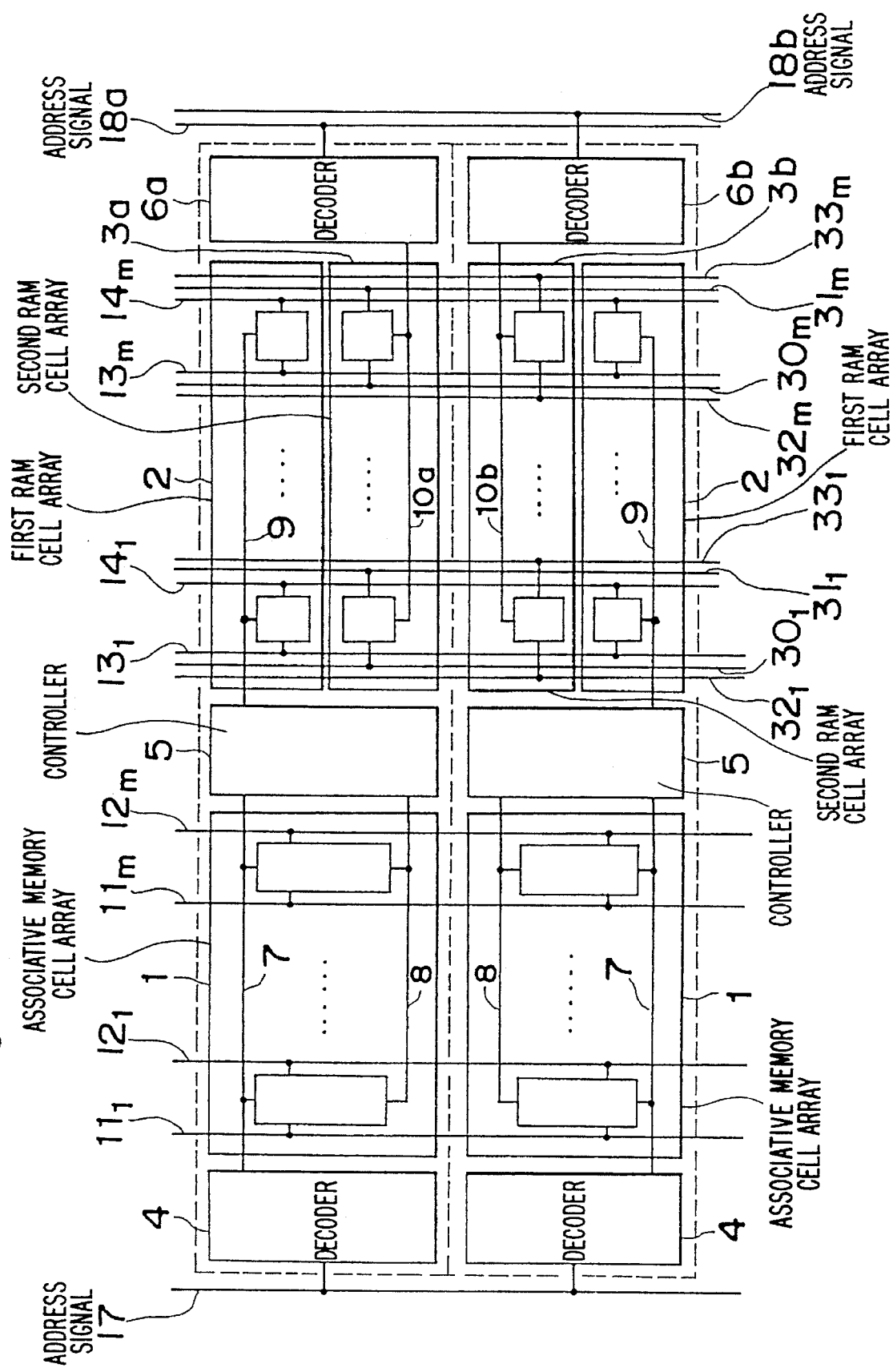
FIG. 10 is a schematic block diagram of a semiconductor memory device according to Example 4 of the present invention.

FIG. 10 shows a schematic block diagram of a semiconductor memory device. This Example differs from Example 1 in that the semiconductor memory device comprises a plurality of entries as denoted by enclosing dashed lines, and in that two kinds of random access memory cell arrays 3a and 3b are used as a second random access memory cell array and are positioned in turn in the entries. Bit lines 11, 12, 13, and 14 and the line of address signal 17 are connected commonly to all the entries, while bit lines 30 and 31, and 32 and 33 are respectively connected to the second random access memory cell arrays 3a and 3b of every other entry, and address signals 18a and 18b are respectively connected to decoders 6a and 6b which send word signals 10a and 10b to the memory cell arrays 3a and 3b respectively.

Next, the operation of this Example is explained below. In a write operation, a logical address of m bits is written in the associative memory cell array 1, and then a physical address of m bits is written in the first random access memory cell array 2, as in Example 1. On the other hand, by using an address signal 18a, the decoder 6a generates a word signal 10a of the second random access memory cell array 3a, and signals and inverted versions thereof are respectively fed to the bit lines 30 and 31. Thus, data of m bits is written in the second random access memory cell array 3a. Furthermore, by using an address signal 18b, the decoder 6b generates a word signal 10b of the second random access memory cell array 3b, and signals and inverted versions thereof are respectively fed to the bit lines 32 and 33. Thus, data of m bits is written in the second random access memory cell array 3b.

In a read operation, signals of m bits of logical addresses and inverted versions thereof are respectively fed to the bit lines 11 and 12 of the associative memory cell array 1 of the address translator, so that the associative memory cell array 1 compares the received logical address and the stored logical address to output a comparison result to the coincidence detection lines 8. Next, by using the coincidence detection line 8, the controller 5 generates a word signal 9 of the first random access memory cell array 2, so that a physical address of m bits is read from the first random access memory cell 2 to be sent to the bit lines 13 and 14. On the other hand, by using an address signal 18a, the decoder 6a generates a word signal 10a of the second random access memory cell array 3a, so that data of m bits is read from the second random access memory cell array 3a to be sent to the bit lines 30 and 31. Furthermore, by using an address signal 18b, the decoder 6b generates a word signal 10b of the second random access memory cell array 3b, so that data of m bits is read from the second random access memory cell array 3b to be sent to the bit lines 32 ad 33. Because the first and second random access memory cell arrays 2 and 3a, 3b are arranged in the same entry, data is sent from adjacent locations.

In a semiconductor memory device according to this Example, two kinds of second random access memory cell arrays 3a and 3b are positioned alternately. Thus, it is possible for example, for a tag memory and a data memory of a cache memory to be used as the first and second kind of random access memory cell arrays 3a and 3b.

Example 5

A plurality of memories can be located close to two address translators so that a plurality of kinds of data can be stored near the address translator. For example, addresses of instructions and those of data can be stored in respective memories close to corresponding memories in the address translators, and both kinds of data can be transmitted fast to a comparator.

Figure 11:
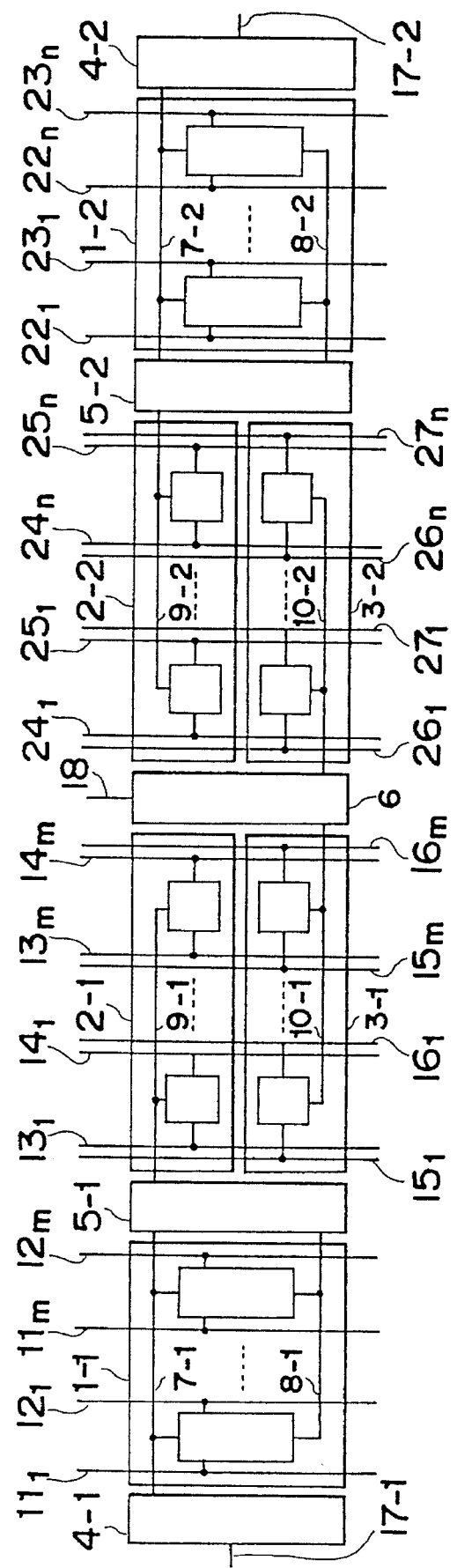
FIG. 11 is a schematic block diagram of a semiconductor memory device according to Example 5 of the present invention.

FIG. 11 shows a block diagram of an example of a semiconductor memory device of a microprocessor having a virtual memory, and also having first and second address translators and a comparator. Two address translators includes two independent parts, one for m bit data and the other for n bit data, each having a structure of the address translator explained in Example 1. That is, the first part of the first address translator includes a first decoder 4-1 for a first address signal 17-1, a first associative memory cell array 1-1, a first controller 5-1, and a first random access memory cell array 2-1, while the other part of the second address translator includes a second decoder 4-2 for a second address signal 17-2, a second associative memory cell array 1-2, a second controller 5-2 and a third random access memory cell array 2-2. A decoder 6 for an address signal 18 is respectively connected to both random access memory cell arrays 3-1 and 3-2 for word signals 10-1 and 10-2. Furthermore, elements 7-1, 7-2, 9-1, 9-2, 10-1 and 10-2 are word signals; elements 8-1 and 8-2 are coincidence detection lines, and elements 11, 12, 13 14, 15, 16, 22, 23, 24, 25, 26 and 27 are bit lines. First and second address translators are positioned symmetrically with respect to the decoder 6, and the four memory cell arrays 2-1 and 3-1, and 2-2 and 2-3 are arranged so that the bitlines 13, 14, 15, 16, 24, 25, 26 and 27 are in parallel with each other. A second random access memory cell array 3-1 is positioned close to the first array 2-1, while a fourth array 3-2 is positioned close to the third array 2-2.

Next, the action of this Example is explained below. In a write operation, the decoders 4-1 and 4-2 generate word signals 7-1 and 7-2 by using address signals 17-1 and 17-2, and signals of logical addresses and inverted versions thereof are respectively fed to the bit lines 11 and 12, and 22 and 23. Thus, logical addresses of m bits and n bits are written in the associative memory cell arrays 1-1 and 1-2. Then, by using the word signals 7-1 and 7-2, the controllers 5-1 and 5-2 generate word signals 9-1 and 9-2 for the random access memory cell arrays 2-1 and 2-2, while signals of physical addresses and inverted versions thereof are respectively fed to the bit lines 13 and 14, and 24 and 25. Thus, physical addresses of m bits and n bits are written in the random access memory cell arrays 2-1 and 2-2. On the other hand, by using an address signal 18, the decoder 6 generates word signals 10-1 and 10-2 of the random access memory cell arrays 3-1 and 3-2 which are positioned in the same adjacent entries of the address translator, and signals and inverted versions thereof are respectively fed to the bit lines 15 and 16, and 26 and 27. Thus, data of m bits and n bits are written in the random access memory cell arrays 3-1 and-3-2.

In a read operation, signals of m bits and n bits of logical addresses and inverted versions thereof are respectively fed to the bit lines 11 and 12, and 22 and 23 of the associative memory cell arrays 1-1 and 1-2 of the address translators, so that the associative memory cell arrays 1-1 and 1-2 compare the received logical addresses and the stored logical addresses so as to output comparison results to the coincidence detection lines 8-1 and 8-2. Next, by using the comparison results, the controllers 5-1 and 5-2 generate word signals 9-1 and 9-2 of the random access memory cell arrays 2-1 and 2-2, so that physical addresses of m bits and n bits are read from the random access memory cell arrays 2-1 and 2-2 to be respectively sent to the bit lines 13 and 14, and 24 and 25. On the other hand, by using an address signal 18 the decoder 16 generates word signals 10-1 and 10-2 of the random access memory cell arrays 3-1 and 3-2 which are arranged in the adjacent entries of the address translators, so that data of m bits and n bits are read out from the random access memory cell arrays 3-1 and 3-2 to be sent via the bit lines 15 and 16, and 26 and 27 to a comparator (not shown).

Two comparisons are performed in the comparator. One is the comparison between physical addresses read out from random access memory cell arrays 2-1 and 3-1, while the other is the comparison between physical addresses read out from random access memory cell arrays 2-2 and 3-2. According to the result of these comparisons, the comparator outputs appropriate signals. Because the random access memory cell arrays 2-1, 2-2, 3-1 and 3-2 are arranged in the adjacent entries, the data is sent out from adjacent places.

As explained above, in a semiconductor memory device according to this Example, a plurality of random access memory cell arrays 2-1, 2-2, 3-1 and 3-2 are positioned in the adjacent entries of the address translators, and the distances between the data outputs of data read from the memory cell arrays 2-1 and 3-1, 2-2 and 3-2 are shortened, so that the data transmittance distance and delay can be shortened when compared with that of the previous art.

Further, a random access memory to be used in general, where two memory cell arrays are positioned at the sides of a decoder which is positioned therebetween, can be used for the memory cell arrays in this Example.

The two address translators can be operated independently of each other. In this case, the timing of the operation of the two address translators may either be the same or different. Furthermore, the number of bits m and n may satisfy any relationship selected from among m>n, m=n and n>m.

In this example, the number of bits of array 1-1 is the same as the number of bits of arrays 2-1 and 3-1. And also the number of bits of array 1-2 is the same as the number of bits of arrays 2-2 and 3-2. However when the number of bits are different, the structure of Example 5 can be partially applied.

Example 6

Figure 12:
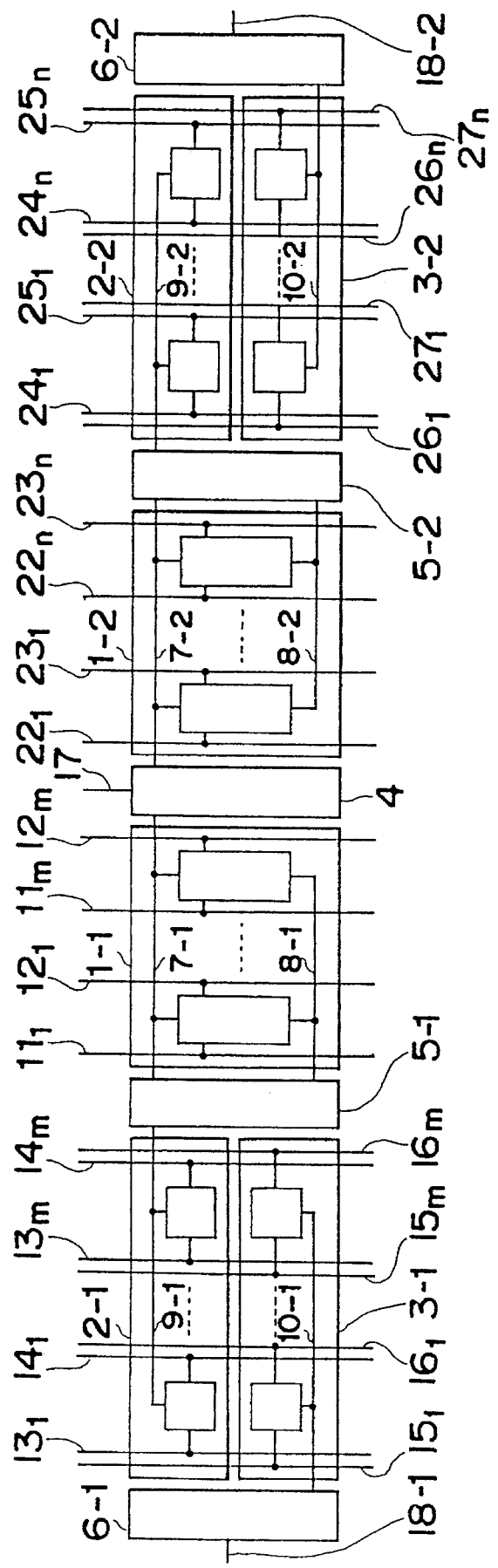
FIG. 12 is a schematic block diagram of a semiconductor memory device according to Example 6 of the present invention.

FIG. 12 shows a block diagram of another example of a semiconductor memory device of a microprocessor having a virtual memory scheme and also having first and second address translators and a comparator, wherein two address translators includes two parts, one for m bit data and the other for n bit data, each having a structure similar to that of the address translator explained in Example 1. That is, the first address translator includes a decoder 6-1 for a first address signal 18-1, a first associative memory cell array 1-1, a first controller 5-1, and first and second random access memory cell arrays 2-1 and 3-1, while the second address translator includes the decoder 6-2 for a second address signal 18-2, a second associative memory cell array 1-2, a second controller 5-2 and third and fourth random access memory cell arrays 2-2 and 3-2. A decoder 6 for an address signal 17 is connected to both associative memory cell arrays 1-1 and 1-2 for word signals 7-1 and 7-2, respectively. Furthermore, elements 7-1, 7-2, 9-1, 9-2, 10-1 and 10-2 are word signals; elements 8-1 and 8-2 are coincidence detection lines, and elements 11, 12, 13, 14, 15, 16, 22, 23, 24, 25, 26 and 27 are bit lines. The former six bit lines 11, 12, 13, 14, 15 and 16 all consist of m bit lines designated by number 1 to m. The latter six bit lines 22, 23, 24, 25, 26 and 27 all consist of n bit lines designated by a number 1 to n. A second random access memory cell array 3-1 is positioned close to the first array 2-1, while a fourth array 3-2 is positioned closed to the third array 2-2. A first decoder 6-1 and a second decoder 6-2 for address signals 18-1 and 18-2 are respectively connected to the second and fourth random access memory cell arrays 3-1 and 3-2. The two address translators and the memory cell arrays 3-1 and 3-2 and the decoders 6-1 and 6-2 are positioned symmetrically with respect to the decoder 4, and the four memory cell arrays 2-1, 3-1, 2-2 and 3-2 are arranged so that the bit lines 13, 14, 15, 16, 24, 25, 26, and 27 are in parallel with each other.

Next, the operation of this Example is explained below. In a write operation, the decoder 4 generates word signals 7-1 and 7-2 by using address signal 17, and signals of logical addresses and inverted versions thereof are respectively fed to the bit lines 11 and 12, and 22 and 23. Thus, logical addresses of m bits and of n bits are written in the associative memory cell arrays 1-1 and 1-2. Then, by using the word signals 7-1 and 7-2, the controllers 5-1 and 5-2 generate word signals 9-1 and 9-2 for the random access memory cell arrays 2-1 and 2-2, while signals of physical addresses and inverted versions thereof are respectively fed to the bit lines 13 and 14, and 24 and 25. Thus, physical addresses of m bits and n bits are written in the random access memory cell arrays 2-1 and 2-2. On the other hand, by using address signals 18-1 and 18-2, the first and second decoders 6-1 and 6-2 generate word signals 10-1 and 10-2 of the random access memory cell arrays 3-1 and 3-2 which are positioned in the adjacent entries of the address translators, and signals and inverted versions thereof are respectively fed to the bit lines 15 and 16, and 26 and 27. Thus, data of m bits and of n bits are written in the random access memory cell arrays 3-1 and 3-2.

In a read operation, signals of m bits and n bits of logical addresses and inverted versions thereof are respectively fed to the bit lines 11 and 12, and 22 and 23 of the associative memory cell arrays 1-1 and 1-2 of the address translators, so that the associative memory cell arrays 1-1 and 1-2 compare received logical addresses and the stored logical addresses so as to output comparison results to the coincidence detection lines 8-1 and 8-2. Next, by using the comparison results, the controllers 5-1 and 5-2 generate word signals 9-1 and 9-2 of the random access memory cell arrays 2-1 and 2-2, so that physical addresses of m bits and of n bits are read from the random access memory cell arrays 2-1 and 2-2 to be respectively fed to the bit lines 13 and 14, and 24 and 25. On the other hand, by using address signals 18-1 and 18-2, the decoders 6-1 and 6-2 generate word signals 10-1 and 10-2 of the random access memory cell arrays 3-1 and 3-2 which are arranged in the adjacent entries of the address translators, so that data of m bits and n bits are read out from the random access memory cell arrays 3-1 and 3-2 to be sent via the bit lines 15 and 16, and 26 and 27 to a comparator (not shown). Two comparisons are preformed in the comparator. One is the comparison between physical addresses read out from random access memory cell arrays 2-1 and 3-1, while the other is the comparison between physical addresses read out from random access memory cell arrays 2-2 and 3-2. According to the result of these comparisons, the comparator outputs appropriate signals. Because the random access memory cell arrays 2-1, 2-2, 3-1 and 3-2 are arranged in the adjacent entries, the data is sent out from adjacent places.

As explained above, in a semiconductor memory device according to this Example, a plurality of random access memory cell arrays 2-1, 2-2, 3-1 and 3-2 are positioned in the adjacent entries of the address translator, and the distances between the data outputs of data read from the memory cell arrays 2-1 and 3-1, 2-2 and 3-2 are shortened, so that the data transmittance distance and delay can be shortened when compared with that of the previous art.

Further, an associative memory to be used in general, where two memory cell arrays are positioned at sides of a decoder positioned therebetween, can be used for memory cell arrays in this Example.

The two the address translators can be operated independently of each other. In this case, the timing of the operations of the two address translators may either be the same or different. Furthermore, the number of bits m and n may satisfy any relationship selected from among m>n, m=n and n>m.

In this example, the number of bits of array 1-1 is the same as the number of bits of arrays 2-1 and 3-1. And also the number of bits of array 1-2 is the same as the number of bits of arrays 2-2 and 3-2. However when the number of bits are different, the structure of Example 6 can be partially applied.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A semiconductor memory device having an address translator and a comparator, said address translator having an entry, said entry of said address translator comprising:
   (a) an associative memory cell array for storing and comparing a logical address of l bits, said associative memory cell array comprising l associative memory cells aligned in a word signal direction;
   (b) a first decoder connected to said associative memory cell array for generating a first word signal for said associative memory cell array;
   (c) a first random access memory cell array for storing a physical address of m bits, said first random access memory cell array comprising m random access memory cells aligned in the word signal direction;
   (d) a control means connected to said associative memory cell array and said first random access memory cell array for generating a second word signal for said first random access memory cell array according to said first word signal and a result of a comparison by said associative memory cell array;
   (e) a second random access memory cell array for storing a physical address of n bits, wherein $n \leq m$, said second random access memory cell array comprising n random access memory cells aligned in the word signal direction;
   (f) a second decoder connected to said second random access memory cell array for generating a third word signal for said second random access memory cell array;
   wherein outputs of said first and second random access memory cell arrays are connected to and compared by the comparator which outputs a signal upon coincidence between said outputs of said first and second random access memory cell arrays;
   wherein $L_{RAM} < L_{CAM}$, in which $L_{CAM}$ denotes a width of said associative memory cell array in a direction of bit signals and $L_{RAM}$ denotes a width of said first random access memory cell array in a direction of bit signals, said associative memory cell array and said first random access memory cell array being arranged with said control means interposed therebetween, said first word signal being parallel to said second word signal and bit signals in said associative memory cell array being parallel to bit signals in said first random access memory cell array; and
   said second random access memory cell array being arranged at least partly in a space beside said first random access memory cell array so that said second word signal is parallel to said third word signal, said bit signals of said first random access memory cell array being parallel to bit signals of said second random access memory cell array and said bit signals of said second random access memory cell array cross said first random access memory cell array, and said space having an area of a length of said first random access memory cell array in a direction of word signal and a width of $(L_{CAM} - L_{RAM})$.

2. A semiconductor memory device as recited in claim 1, wherein said address translator includes a plurality of said entries.

3. A semiconductor memory device as recited in claim 1, wherein said second random access memory cell array is a cache tag memory cell array.

4. A semiconductor memory device as recited in claim 2, wherein said second random access memory cell array is a cache tag memory cell array.

5. A semiconductor memory device having at least first and second address translators and a comparator, said first and second address translators having a first entry and a second entry, respectively:
   said first and second entries of the first and second address translators comprising:
   (a) a first associative memory cell array for storing and comparing a logical address of l bits, said first associative memory cell array comprising l associative memory cells aligned in a word signal direction;
   (b) a first decoder connected to said first associative memory cell array for generating a first word signal for said first associative memory cell array;
   (c) a first random access memory cell array for storing a physical address of m bits, said first random access memory cell array comprising m random access memory cells aligned in the word signal direction;
   (d) a first control means connected to said first associative memory cell array and to said first random access memory cell array for generating a second word signal for said first random access memory cell array according to said first word signal and a result of a comparison generated by said first associative memory cell array;
   (e) a second random access memory cell array for storing a physical address of n bits, wherein $n \leq m$, said second random access memory cell array comprising n random access memory cells aligned in the word signal direction;
   (f) a second associative memory cell array for storing and comparing a logical address of p bits, said second associative memory cell array comprising p associated memory cells aligned in the word signal direction;
   (g) a second decoder connected to said second associative memory cell array for generating a third word signal for said second associative memory cell array;
   (h) a third random access memory cell array for storing a physical address of q bits, said third random access memory cell array comprising q random access memory cells aligned in the word signal direction;
   (i) a second control means connected to said second associative memory cell array and said third random access memory cell array for generating a fourth word signal for said third random access memory cell array according to said third word signal and a result of a comparison generated by said second associative memory cell array;
   (j) a fourth random access memory cell array for storing a physical address of r bits, wherein $r \leq q$ said fourth random access memory cell array comprising r random access memory cells aligned in the word signal direction; and wherein the device further comprises:
   (k) a third decoder connected to said second and fourth random access memory cell arrays for generating fifth and sixth word signals for said second and fourth random access memory cell arrays;
   wherein said third decoder is physically disposed between said first and second entries of said first and second translators so that bit-lines of said random access memory cell arrays which are connected to said first, second, third and fourth random access memory cell arrays are physically disposed in parallel to each other;

and wherein outputs of said random access memory cell arrays are connected to and compared by the comparator which outputs a signal upon coincidence between said outputs of said random access memory cell arrays;

wherein $L_{RAM} < L_{CAM}$, in which $L_{CAM}$ denotes a width of said associative memory cell arrays in a direction of bit signals and $L_{RAM}$ denotes a width of said random access memory cell arrays in a direction of bit signals, said first associative memory cell array and said first random access memory cell array being arranged with said first control means interposed therebetween, said first word signal being parallel to said second word signal and bit signals in said first associative memory cell array being parallel to bit signals in said first random access memory cell array;

said second associative memory cell array and said third random access memory cell array being arranged with said second control means interposed therebetween, said third word signal being parallel to said fourth word signal and bit signals in said second associative memory cell array being parallel to bit signals in said third random access memory cell array;

said second random access memory cell array being arranged at least partly in a space beside said first random access memory cell array so that said second word signal is parallel to said fifth word signal, said bit signals of said first random access memory cell array being parallel to bit signals of said second random access memory cell array and said bit signals of said second random access memory cell array cross said first random access memory cell array, and said space having an area of a length of said first random access memory cell array in the word signal direction and a width of $(L_{CAM} - L_{RAM})$; and said fourth random access memory cell array being arranged at least partly in a space beside said third random access memory cell array so that said fourth word signal is parallel to said sixth word signal, said bit signals of said third random access memory cell array being parallel to bit signals of said fourth random access memory cell array and said bit signals of said fourth random access memory cell array cross said third random access memory cell array, and said space having an area of a length of said third random access memory cell array in the word signal direction and a width of $(L_{CAM} - L_{RAM})$.

6. A semiconductor memory device as recited in claim 5, wherein said first and second address translators each include a plurality of said entries.

7. A semiconductor memory device as recited in claim 5, wherein said second and fourth random access memory cell arrays are each cache tag memory cell arrays.

8. A semiconductor memory device as recited in claim 6, wherein said second and fourth random access memory cell arrays are each cache tag memory cell arrays.

9. A semiconductor memory device having at least first and second address translators and a comparator, said first and second address translators having a first entry and a second entry, respectively:

said first and second entries of the first and second address translators comprising:

(a) the first associative memory cell array for storing and comparing a logical address of l bits, said associative memory cell array comprising l associative memory cells aligned in a word signal direction;

(b) a first random access memory cell array for storing a physical address of m bits, said first random access memory cell array comprising m random access memory cells aligned in the word signal direction;

(c) a first control means connected to said first associative memory cell array and said first random access memory cell array for generating a second word signal for said first random access memory cell array according to a first word signal of said first associative memory cell array and a result of a comparison generated by said first associative memory cell array; and (d) a second random access memory cell array for storing a physical address of n bits, wherein $n \leq m$, said second random access memory cell array comprising n random access memory cells aligned in the word signal direction;

(e) a second decoder connected to said second random access memory cell array for generating a third word signal for said second random access memory cell array;

(f) the second associative memory cell array for storing and comparing a logical address of p bits, said second associative memory cell array comprising p associative memory cells aligned in the word signal direction;

(g) a third random access memory cell array for storing a physical address of q bits, said third random access memory cell array comprising q random access memory cells aligned in the word signal direction;

(h) a second control means connected to said second associative memory cell array and said third random access memory cell array for generating a fifth word signal for said third random access memory cell array according to a fourth word signal of said second associative memory cell array and a result of a comparison generated by said second associative memory cell array;

(i) a fourth random access memory cell array for storing a physical address of r bits, wherein $r \leq q$, said fourth random access memory cell array comprising r random access memory cells aligned in the word signal direction; and wherein the device further comprises:

(j) a third decoder connected to said fourth random access memory cell array for generating a sixth word signal for said fourth random access memory cell array;

(k) a first decoder connected to said first and second associative memory cell arrays for generating said first and fourth word signals for said first and second associative memory cell arrays, wherein said first decoder is physically disposed between said first and second entries of the first and second translators so that bit-lines of said random access memory cell arrays which are connected to first, second, third and fourth random access memory cell arrays are physically disposed in parallel to each other, and wherein outputs of said random access memory cell arrays are connected to and compared by the comparator which outputs signals upon coincidence between said outputs of said random access memory cell arrays;

wherein $L_{RAM} < L_{CAM}$, in which $L_{CAM}$ denotes a width of said associative memory cell arrays in a direction of bit signals and $L_{RAM}$ denotes a width of said random access memory cell arrays in a direction of bit signals, said first associative memory cell array and said first random access memory cell array being arranged with said first control means interposed therebetween, said first word signal being parallel to said second word signal and bit signals in said first associative memory cell array being parallel to bit signals in said first random access memory cell array;

said second associative memory cell array and said third random access memory cell array being arranged with said second control means interposed therebetween, said fourth word signal being parallel to said fifth word signal and bit signals in said second associative memory cell array being parallel to bit signals in said third random access memory cell array;

said second random access memory cell array being arranged at least partly in a space beside said first random access memory cell array so that said second word signal is parallel to said third word signal of said second random access memory cell array, said bit signals of said first random access memory cell array being parallel to bit signals of said second random access memory cell array and said bit signals of said second random access memory cell array cross said first random access memory cell array, and said space having an area of a length of said first random access memory cell array in the word signal direction and a width of $(L_{CAM} - L_{RAM})$; and said fourth random access memory cell array being arranged at least partly in a space beside said third random access memory cell array so that said fifth word signal is parallel to said sixth word signal, said bit signals of said third random access memory cell array being parallel to bit signals of said fourth random access memory cell array and said bit signals of said fourth random access memory cell array cross said third random access memory cell array, and said space having an area of a length of said third random access memory cell array in the word signal direction and a width of $(L_{CAM} - L_{RAM})$.

10. A semiconductor memory device as recited in claim 9, wherein first and second address translators each include a plurality of said entries.

11. A semiconductor memory device as recited in claim 9, wherein said second and fourth random access memory cell arrays are each cache tag memory cell arrays.

12. A semiconductor memory device as recited in claim 10, wherein said second and fourth random access memory cell arrays are each cache tag memory cell arrays.

* * * * *